United States Patent Office 3,481,893
Patented Dec. 2, 1969

3,481,893
PHONOGRAPH RECORD MOLDING COMPOSITIONS COMPRISING CHLORINE-CONTAINING TERPOLYMERS
Wolfgang Pungs, Troisdorf, Robert Buning, Oberlar, and Karlheinz Diessel, Troisdorf, Germany, assignors to Dynamit Nobel Aktiengesellschaft, Troisdorf Bezirk Cologne, Germany, a corporation of Germany
No Drawing. Filed July 31, 1967, Ser. No. 657,038
Claims priority, application Germany, Aug. 13, 1966, D 50,849
Int. Cl. C08f 15/30, 1/62
U.S. Cl. 260—23                                    8 Claims

ABSTRACT OF THE DISCLOSURE

There are disclosed novel molding compounds on a basis of copolymers of vinyl chloride and vinyl acetate, the same being suitable for use in the manufacture of phonograph records since the shrinkage characteristics associated with the conventional vinyl chloride-vinyl acetate copolymers are eliminated. The copolymers are produced by polymerizing vinyl chloride and vinyl acetate at a temperature of from −5 to −25° C., using redox catalysts and conducting the polymerization in the presence of from 8 to 20 weight percent of a lower aliphatic alcohol, and either 10 to 30 weight percent of 1,2-trans-dichloroethylene or 3–15 weight percent of trichloroethylene, in a polymerization zone wherein intensive and intimate admixing of the components of the polymerization can be effected.

The copolymer recovered is then mixed with the conventional additives, such as stabilizers, lubricants, fillers and the like and the resultant products further processed into high quality phonograph records.

---

This invention relates to molding compounds on a basis of copolymers of vinyl chloride and vinyl acetate. More particularly, it relates to the manufacture of phonograph records having improved shrinkage characteristics by the use of such molding compounds.

Most phonograph records are prepared from copolymers of vinyl chloride and vinyl acetate containing between 10 and 30 percent acetate. These copolymers provide not only easy workability and adequate resistance to wear and breakage, but also excellent sound reproduction and low record hiss. These desirable qualities, however, are partially offset by the disadvantage that the records can be so deformed as a result of shrinkage, especially upon exposure to relatively low temperatures i.e., about 50° C., resulting in annoying grinding noises being produced when the records are played. The problem of the shrinkage and orientation tendencies of phonograph records manufactured from vinyl chloride-vinyl acetate copolymers does not usually occur until some time after the records are taken out of the press, so that losses in quality of sound reproduction due to shrinkage and orientation do not take place until a later time. In countries having a warm climate the danger of phonograph record shrinkage is more severe and has been accepted as inevitable.

It is an object of the present invention to provide an improved molding compound having the advantageous properties of the copolymers of vinyl chloride and vinyl acetate but without the tendency to shrinkage of the known compounds.

A further object of this invention is to provide molding compounds on the basis of copolymers of vinyl chloride and vinyl acetate which are outstandingly suitable for use in the manufacture of phonograph records.

Another object of the invention is to provide a phonograph records prepared from copolymers of vinyl chloride and vinyl acetate which have outstanding sound reproduction qualities, the same not being adversely affected at or in the range of temperatures as normally encountered in geographical areas having seasonal or continuous so-called hot weather.

In accordance with the invention, it has been found that the above objects are achieved and that the disadvantages of prior teachings are obviated by the use of molding compounds produced by polymerization of vinyl chloride and vinyl acetate at a temperature of between −5 and −25° C. using redox catalysts, the polymerization being conducted in the presence of 8 to 20 weight percent of a lower aliphatic alcohol and either 10 to 30 weight percent of 1,2-trans-dichloroethylene or 3 to 15 weight percent of trichloroethylene in a polymerization zone providing for intensive agitation and intermixing, such as in a rotating cylindrical vessel containing grinding bodies or in a vessel provided with shear-action mixing devices.

The percentages as given are percentages based on the mixture of the vinyl chloride and vinyl acetate monomers.

Suitable lower aliphatic alcohols include methanol, ethanol, propanol and isopropanol.

The redox systems as employed herein consist of a reducing agent, such as ascorbic acid, iso-ascorbic acid, dioxymaleic acid, metal salts such as iron, cobalt of chromium, and a peroxide such as hydrogen peroxide, methyl hydroperoxide, cyclohexanyl acetyl sulfonyl peroxide or the like.

It is to be considered to be most surprising that copolymers of vinyl chloride and vinyl acetate prepared under these conditions have the improved characteristics particularly as concerns shrinkage tendencies as required for the manufacture of phonograph records, because, in contrast to homopolymers of vinyl chloride, copolymers formed from vinyl chloride and vinyl acetate and having the stated vinyl acetate content have hardly any syndiotactic structure; cf. J. Polym. Sci. 56, 501 (1962).

The copolymers obtained under the above conditions can be admixed with the customary additives, such as stabilizers, lubricants, fillers etc. and thereafter further worked in the conventional equipment to provide biscuits, granules or powder mixtures suitable for use in the manufacture of recording discs. Perfect, low-shrinkage phonograph records characterized by substantially no record hiss and crackle can be produced from the aforesaid molding compounds using therefor the preheaters, plastifiers and record presses customarily used in the phonograph record manufacturing industry. The use of the instant compounds is particularly advantageous in the case of stereo records in which the quality requirements are particularly high.

The invention will be more fully understood from the following examples which are given by way of illustration and without any intention to be limited thereto.

EXAMPLE 1

Seven balls constructed from V2A steel and having a diameter of 35 mm., 300 g. of vinyl chloride, 130 g. of vinyl acetate, and 70 g. of 1,2-trans-dichloroethylene were introduced into a cylindrical nickel vessel having a diameter of 110 mm., and the contents then coloed to −15° C. Thereafter, 2 g. of ascorbic acid dissolved in 50 g. of methanol, 2 ml. of hydrogen peroxide (35% solution) and 1 ml. of iron (III) sulfate solution (1% solution in water) were added. The vessel was rotated horizontally on rollers at 50 r.p.m. and maintained at −15° C. by means of a brine bath. After 21 hours of polymerization time, there was present a white, fine powder in the autoclave, which after drying at 50° C. amounted to 391 g. Analysis showed an acetate content of 19.7% and a chlorine content of 46.95%.

EXAMPLE 2

In the same vessel, 330 g. of vinyl chloride, 140 g. of vinyl acetate and 30 g. of trichloroethylene were polymerized using the same redox system as in Example 1. The weight of the fine, white polymer powder which was recovered amounted after drying to 386 g.; the acetate content was 19.5%, and the chlorine content was 46.1%.

EXAMPLE 3

100 parts of the copolymer obtained according to the procedure set out in Example 1 were mixed with 1.5 parts of barium-cadmium stabilizer, 1 part of epoxidized soybean oil, 0.5 part of montanic ester and 0.3 part of carbon black, and plastified on a roller mixer at a temperature of 150° C. Biscuits were cut from the sheet following the stripping thereof from the mixer and the biscuits preheated at a temperature of 150° C. for a period of 10 minutes in a preheating oven conventionally used for the treatment of phonograph record molding compounds. The biscuits were then pressed into phonograph records having a diameter of 30 cm. in a phonograph record press, using a 43-second cycle.

Phonograph records were made in the same manner from a conventional copolymer having the same acetate content; the rolling nd preheating temperature employed in this instance, however, amounted to 140° C. The following characteristics were determined for the phonograph records made in this manner and according to the method of the invention:

| Copolymer manufactured | Pursuant to the invention | Conventionally |
|---|---|---|
| Surface noise at unrecorded points | −43 to −45 db | −42 to −45.5 db. |
| Shrinkage at 70° C. in one hour | 0.24% | 0.81%. |
| Ball-pressure hardness: | | |
| 10 sec | 1,270 kp./cm.² | 1,290 kp./cm.² |
| 60 sec | 1,170 kp./cm.² | 1,160 kp./cm.² |

(DIN 53,456).
Db=decibel.

EXAMPLE 4

100 parts of the copolymer obtained according to the procedure of Example 2 were mixed with 1.5 parts of barium-cadmium stabilizer, one part of epoxidized soybean oil, 0.5 part of montanic ester and 0.3 part of carbon black, and the resulting mass extruded through a perforated plate using a double worm extruding machine at a temperature of 120° C. whereby filaments were formed which were cut up in a chopping machine to form cylindrical granules. The granular product was then preheated for 10 minutes at 145° C. in a preheating oven as conventially used for the treatment of phonograph record molding compounds. Thereafter the granular product was pressed into phonograph records having a 30 cm. diameter in a cycle of 43 seconds.

In like manner a conventional copolymer having the same acetate content was employed in the manufacture of phonograph records. However, in this instance the granulating temperatures were between 110° C. and 130° C. and the preheating temperature was 140° C.

The following characteristics were found for the phonograph records manufactured according to the invention and those prepared of conventional vinyl chloride-vinyl acetate copolymer (acetate content 20.1%):

| Copolymer manufactured | Pursuant to the invention | Conventionally |
|---|---|---|
| Surface noise at unrecorded points | −43 to −45 db | −43 to −45 db. |
| Shrinkage at 70° C. in one hour | 0.21% | 0.85%. |
| Ball-pressure hardness: | | |
| 10 sec | 1,270 kp./cm.² | 1,280 kp./cm.² |
| 60 sec | 1,160 kp./cm.² | 1,160 kp./cm.² |

(DIN 53,456).

EXAMPLE 5

A mixture in powder form was prepared from 100 parts of the copolymer produced as set out in Example 2 along with 1.2 parts of barium-cadmium stabilizer, 0.5 part of epoxidized soybean oil, 0.5 part of montanic ester and 0.3 part of carbon black using a Henschel fluid mixer for the mixing. The resulting mixture was thereafter plastified at a temperature of 110° C. to 155° C. in a plastifying machine, such as for example the Egar Werner and Pfleiderer Compounder, to form strands which were pressed into phonograph records having 30 cm. diameters using a phonograph record press and a 40-second cycle.

Phonograph records were made in the same manner from a conventional copolymer having the same acetate content, the temperatures in the plastifying system amounting in this case to between 100° C. and 150° C.

The following characteristics were found for the phonograph records produced in accordance with the invention and from the conventional vinyl chloride-vinyl acetate copolymers:

| Copolymer manufactured | Pursuant to the invention | Conventionally |
|---|---|---|
| Surface noises at unrecorded points | −43 to −45 db | −42 to −45 db. |
| Shrinkage at 70° C. in one hour | 0.18% | 0.75%. |
| Ball-pressure hardness: | | |
| 10 sec | 1,165 kp./cm.² | 1,270 kp./cm.² |
| 60 sec | 1,160 kp./cm.² | 1,165 kp./cm.² |

(DIN 53,456).

As additives of the molding compounds according to this invention can be employed heat stabilizers or mixtures of stabilizers as, tribasic lead stearate, barium-cadmium stabilizers such as barium-cadmium stearate or barium-cadmium laurate, organic tin- or antimony compounds as dibutyl tin dilaurate, esters of β-aminocrotonic acid or epoxidized soybean oil. These stabilizers are used in amounts of 0.5 to 1.5, preferably 0.5 to 1.0 weight percent. Instances of lubricants which are suitable for use herein include calcium stearate, montanic esters such as for example E-waxes or fatty acid esters. Calcium stearate is used in amounts of 0.1 to 0.5 weight percent, the esters in amounts of 0.3 to 0.8, preferably 0.4 to 0.6 weight percent. Fillers used as additives are 0.2 to 0.8 weight percent carbon black, 1 to 10 weight percent calcium carbonate or 1.0 to 3.0 weight percent carnauba-wax or mixtures of these fillers.

Conventionally manufactured copolymers are produced for instance in aqueous medium in which the monomer vinyl compounds are dispersed at a temperature in the range 20 to 50° C. As suspension stabilizer methylcellulose or hydroxyethylcellulose may be used. The polymerisation is carried out in a stainless steel autoclave with stirring in presence of peroxides as dilauroyl peroxide or cyclohexanesulfonylacetylperoxide. After 15 to 25 hours of polymerisation time the polymer is separated by filtration or centrifugation, washed with methanol and dried in usual ways.

What is claimed is:

1. Copolymers of vinyl chloride and vinyl acetate obtained by polymerizing vinyl chloride with vinyl acetate at a temperature of −5 to −25° C. in the presence of a redox catalyst, 8–20 weight percent of a lower aliphatic alcohol and either 10 to 30 weight percent of 1,2-trans-dichlorethylene or 3–15 weight percent of trichlorethylene calculated on the amount of vinyl chloride and vinyl acetate, in a polymerization zone providing continuous and intimate contact of all the compounds present therein.

2. Copolymers according to claim 1 wherein said redox catalyst comprises a reduction agent selected from the group consisting of ascorbic acid, iso-ascorbic acid and dioxymaleic acid; a metal salt selected from the group consisting of iron, cobalt and chromium salts; and a peroxide selected from the group consisting of hydrogen peroxide, methyl hydroperoxide and cyclohexanyl acetyl sulfonyl peroxide.

3. A copolymer according to claim 1 wherein said lower aliphatic alcohol is selected from the group consisting of methanol, ethanol, propanol and propanol iso-propanol.

4. A copolymer according to claim 1 produced by polymerization of vinyl chloride and vinyl acetate in the presence of methanol, 1,2-trans-dichlorethylene and redox catalyst comprising ascorbic acid, hydrogen peroxide and iron (III) sulfate.

5. A copolymer according to claim 1 produced by polymerization of vinyl chloride and vinyl acetate in the presence of methanol, trichlorethylene and a redox catalyst comprising ascorbic acid, hydrogen peroxide and iron (III) sulfate.

6. A molding compound having improved shrinkage characteristics adapted for use in the manufacture of phonograph records comprising a copolymer in accordance with claim 1 in admixture with at least one member of the group consisting of stabilizers, lubricants, and fillers, said stabilizers being present in an amount of from 0.5–1.5 wt. percent, said lubricant in an amount of from 0.1–0.8 wt. percent and said filler in an amount of from 0.2–10 wt. percent.

7. A molding composition according to claim 6 comprising a copolymer in accordance with claim 4 in admixture with 0.5–1.5 wt. percent barium-cadmium stabilizer, 0.5–1.5 wt. percent epoxidized soybean oil, 0.3 to 0.8 wt. percent montanic ester and 0.2 to 0.8 wt. percent carbon black.

8. A molding compound according to claim 6 comprising a copolymer in accordance with claim 5 in admixture with 0.5–1.5 wt. percent barium-cadmium stabilizer, 0.5–1.5 wt. percent epoxidized soybean oil, 0.3 to 0.8 wt. percent montanic ester and 0.2 to 0.8 wt. percent carbon black.

References Cited
UNITED STATES PATENTS

| | | | |
|---|---|---|---|
| 2,563,414 | 8/1951 | Parker | 260—27 |
| 3,068,211 | 12/1962 | Deanin | 260—80.77 |
| 3,328,365 | 6/1967 | Aubrey et al. | 260—80.77 |
| 3,351,577 | 11/1967 | Krumm | 260—23 |
| 3,382,223 | 5/1968 | Borsini et al. | 260—92.8 |

DONALD E. CZAJA, Primary Examiner

R. A. WHITE, Assistant Examiner

U.S. Cl. X.R.

260—28.5, 41, 45.75, 45.85, 80.77; 274—42